United States Patent [19]
Richardson et al.

[11] 3,857,414
[45] Dec. 31, 1974

[54] INTERNAL THREADED FITTING CONNECTOR

[75] Inventors: William D. Richardson, Palos Heights; Ronald A. Zurawski, Chicago Ridge, both of Ill.

[73] Assignee: Tuthill Pump Company, Chicago, Ill.

[22] Filed: Feb. 26, 1973

[21] Appl. No.: 335,932

[52] U.S. Cl. ................................................ 138/90
[51] Int. Cl. ............................................ F16l 55/10
[58] Field of Search .......... 138/89, 90; 73/420, 115, 73/49.8

[56] References Cited
UNITED STATES PATENTS
2,581,536   1/1952   Johns ................................... 138/90
2,855,003  10/1958   Thaxton ............................... 138/90

*Primary Examiner*—Donald O. Woodiel
*Attorney, Agent, or Firm*—Mann, Brown, McWilliams & Bradway

[57] ABSTRACT

An easily manipulatable plug or connector for closing the open end of an internally threaded fitting, wherein the connector utilizes a pair of outwardly expansible gripper members for attachment to the internal threads of a fitting to be tested and the connector is easily positioned in the secured and sealing position by a simple movement and is easily and quickly removed thereafter.

11 Claims, 11 Drawing Figures

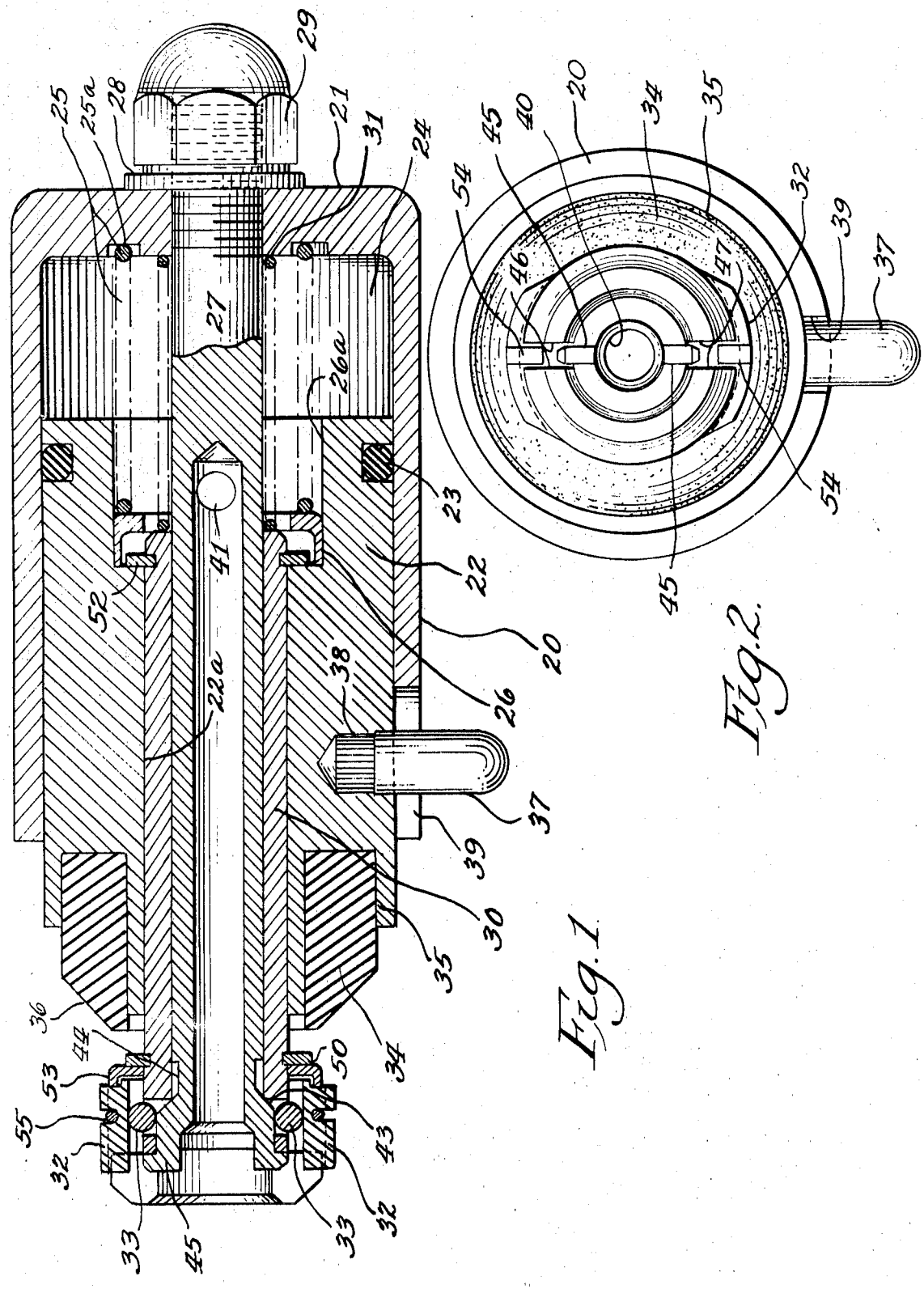

INTERNAL THREADED FITTING CONNECTOR

BACKGROUND OF THE INVENTION

This invention pertains to a plug or connector for closing and sealing internally threaded conduit, tubes or other types of components. It is desirable to be able to quickly close, lock and seal the open ends of such components for purposes of pressure testing or for other purposes. The primary purpose of the present invention is to form a closure in such a manner that a quick and effective closure and seal can be made.

The herein disclosed invention pertains to an easily manipulatable closure which is adapted to automatically grip an internally threaded conduit or other fitting and seal the same upon release of a housing, plunger and sleeve for relative axial movement. By utilization of a pair of outwardly expansible gripping elements, attachment to the threaded fitting is easily and quickly made and the open end of the fitting is put into sealing engagement with an exterior component of the plug.

The plug is so configured and fabricated that by simply rotating an external surface of the connector, the plug is unlocked for action and the gripper members are automatically expanded into a gripping position to securely and frictionally lock against the internal threads of a tube or other fitting. This same movement performs an effective sealing arrangement to obtain substantially fluid-tight relationship between the plug and the end face of a fitting.

In order to release the plug, movement of the housing, plunger and sleeve is reversed.

These and other purposes of the present invention will become more apparent in the course of the ensuing specification and claims when taken with the accompanying drawings, in which:

FIG. 1 is a sectional view of the test plug embodying the present invention;

FIG. 2 is an end view of the test plug illustrated in FIG. 1;

Like elements are designated by like characters throughout the specification and drawings.

Figure 3:
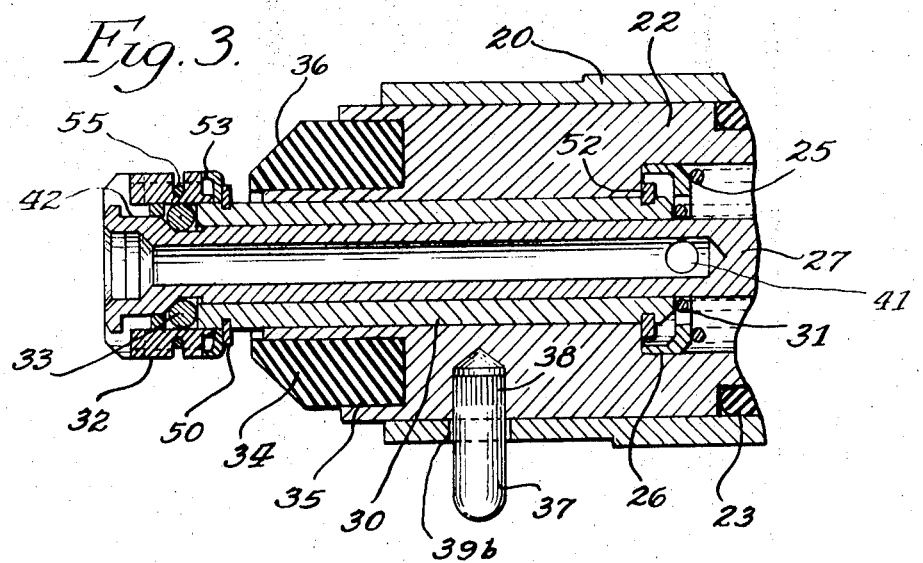
FIG. 3 is a sectional view of the test plug illustrated in FIG. 1 while illustrating a different operative position of the several parts of the test plug.
Figure 5:
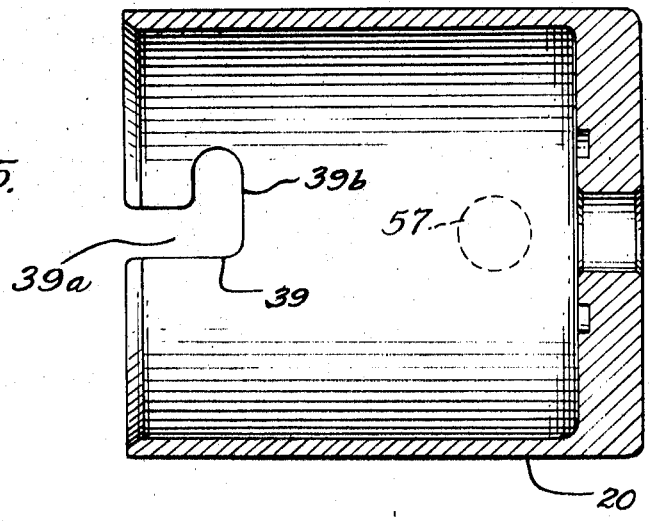
FIG. 5 is a sectional view of the housing illustrated in FIG. 4.
Figure 4:
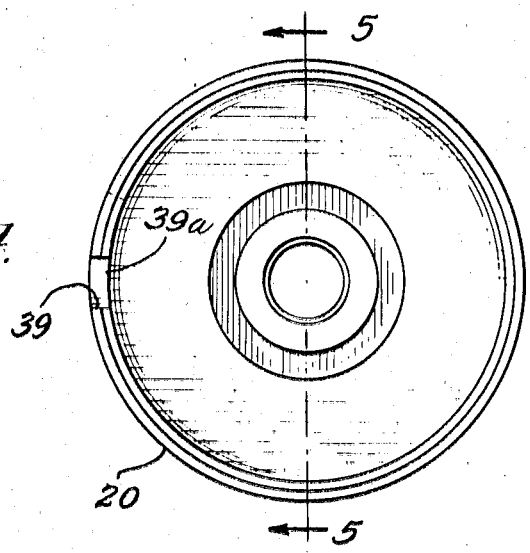
FIG. 4 is an end view of a housing for the test plug illustrated in FIGS. 1–3.

With specific reference now to the drawings, and in the first instance to FIG. 1, the numeral 20 designates a hollow cylindrical housing having an open end and the other end closed by an end wall 21. A hollow cylindrical plunger or piston 22 is slidably mounted within the cylinder. A bore 22a extends through the plunger. Plunger 22 carries a packing 23 to seal the plunger against the internal wall of the housing, thus providing for a sealed space 24 between the end wall 21 of the housing and the plunger 22. Plunger 22 is slidably mounted within the housing and is biased outwardly relative to the housing by a spring 25. Spring 25 is seated in a recess 25a in the end wall and extends between the end wall 21 of the housing and a spacer 26 which is seated within an enlarged bore portion 26a in the plunger. Bore portion 26a faces end wall 21.

A stem 27 is fixed to the housing and extends through end wall 21 and through bore 22a in the plunger 22. Stem 27 may be screw-threaded in the end wall 21. A seal 28 surrounds that end of the stem extending through the end wall 21 and is adapted to be brought up tightly against the exterior side of the end wall 21 by a nut 29 which is threaded onto the exterior threaded end of stem 27. Nut 29 enables a tight sealing fit of the seal 28 around the exterior end of the stem and between end wall 21 and nut 29 to insure that the threaded opening in the end wall is sealed against loss of fluid pressure.

Stem 27 extends through a sleeve 30 which is slidably mounted in the bore 22a of plunger 22. A spring 31 extends between end wall 21 and an end of the sleeve within plunger 22 so as to provide an outward bias against sleeve 30.

Sleeve 30 carries a pair of gripping jaws 32 on the outer end thereof. These jaws are mounted for radial inward and outward movement to thereby provide an internal gripping connection with a conduit or other internally threaded fitting inserted over the jaws. A pair of balls 33 are carried by the sleeve 30 and are adapted to coact with the end of stem 27, sleeve 30 and the jaws 32 to cause radial inward and outward movement upon relative axial movement of the sleeve 30 and stem 27 in a manner which will be explained hereinafter.

Jaws 32 and the exterior ends of sleeve 30 and stem 27 are positioned outwardly of an annular block of sealing material 34 which is carried by the outer end of plunger 22. The sealing block 34 may be seated in an annular recess 35 in the exterior end of the plunger 22. It is preferred that the inner portion of the plunger which defines the inner wall of the recess 35 for the sealing block 34 be extended outwardly relative to the remainder of the plunger to provide a longer bearing area for sleeve 30. The outer face of the sealing block 34 may be beveled as at 36. The outer face of the annular sealing block is adapted to engage the end wall of a conduit or other fitting inserted over the gripping jaws 32.

As will be noted in FIGS. 1, 2, 4 and 5, plunger 22 carries a locking projection in the form of a pin 37 which is press fitted in a recess 38 which extends radially into the plunger 22. This pin extends outwardly through a bayonet type slot 39 (FIGS. 4 and 5) in the housing. The bayonet slot is formed through the wall of the housing and opens through the end wall of the housing as at 39a. The slot terminates in a slotted portion 39b which extends at right angles to the slot portion 39a and circumferentially of the housing wall. When pin 37 is seated in the portion 39b, relative axial movement of the housing and plunger are precluded. The housing and plunger may be unlocked to allow relative axial movement by rotating housing 20 relative to plunger 22 so that the pin 37 is aligned with the axially extending portion 39a of the slot.

Figure 9:
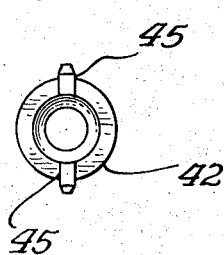
FIG. 9 is an end view of the stem illustrated in FIG. 8.
Figure 8:
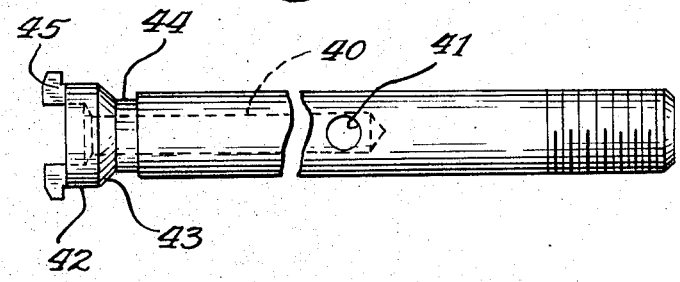
FIG. 8 is a side view of a stem illustrated in FIGS. 1–3.

As will be particularly noted in FIGS. 1, 8 and 9, stem 27 includes a bore 40 extending from the outer end of the stem to a point within the enlarged bore portion 26a of plunger 22. An aperture 41 is formed at right angles to the bore 40 so as to communicate fluid in bore 40 to the space defined by bore portion 26a and hence to chamber 24.

The exterior operating end of the stem has a portion of enlarged diameter as at 42. A beveled surface 43 adjoins this enlarged diameter and merges with a circular recess 44 of smaller diameter than the main body portion of the stem. The outermost end of portion 42 of enlarged diameter carries a pair of diametrically spaced tabs 45 which project radially outwardly as well as axially outwardly from the portion of enlarged diameter 42.

Figure 7:
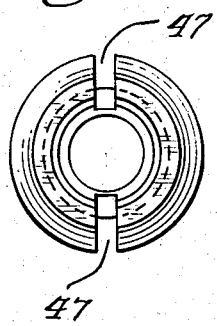
FIG. 7 is an end view of the sleeve illustrated in FIG. 6.
Figure 6:
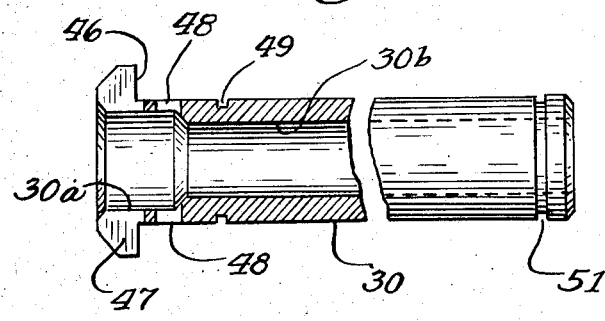
FIG. 6 is a sectional view of an actuating sleeve illustrated in FIGS. 1–3.

Sleeve 30, as will be noted in FIGS. 6 and 7, includes an abutment 46 having a larger diameter than the remainder of the sleeve. This abutment provides a confining stop for the jaws 32. This abutment includes a pair of diametrically opposed slots 47 therein for purposes of receiving the tabs 45 to preclude relative rotation of the stem and sleeve. A pair of diametrically opposed ball receiving apertures 48 are formed in the sleeve at a point spaced from the abutment 46 but closely adjacent thereto. Apertures 48 confine the balls 33 while allowing radial inward and outward movement. The wall of the sleeve is recessed at 49 to receive a retaining ring 50 (FIG. 1). The inner end of the sleeve is also recessed at 51 to receive a locking ring 52 (FIG. 1) which is adapted to bear against the inner end wall of the bore portion 26a to provide an outward movement stop for the sleeve relative to the plunger 22. The sleeve has an enlarged bore portion 30a to slidably receive portion 42 of the stem. The remaining portion 30b of the bore in the sleeve generally matches the exterior diameter of the remaining portion of the stem.

Figure 10:
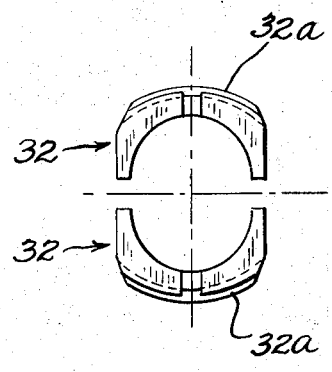
FIG. 10 is an end view of a pair of actuating jaws illustrated in FIGS. 1–3.
Figure 11:
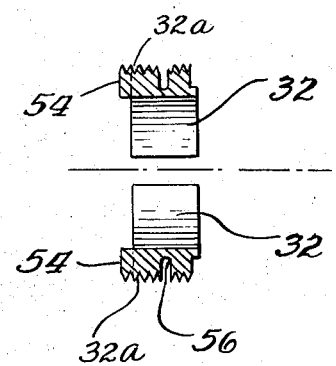
FIG. 11 is a sectional view of the pair of jaws illustrated in FIGS. 1, 3 and 10.

The jaws 32 are confined axially relative to the sleeve by means of a washer 53 which abuts against ring 50 (FIG. 1 and FIG. 3). These jaws, as will be noted in FIGS. 10 and 11, include outwardly projecting tabs 54 which are adapted to be received within the slots 47 of abutment 46, thus precluding rotation relative to the sleeve. The jaws are adapted to be biased radially inwardly by means of a garter spring 55 (FIGS. 1 and 3), which spring surrounds the jaws and is seated in circumferentially extending grooves 56 in the outer walls of the jaws. Jaws 32 are arcuately formed, as will be noted in FIGS. 2 and 10.

Jaws 32 are preferably provided with exterior male threads 32a (FIGS. 10 and 11) when the plug is to be used with internally threaded conduits. These threads are sized to mate and interlock with the interior threads so that the engaged threads provide positive abutment surfaces resisting axial removal of the plug.

The operation of the plug is as follows: In the nonoperative position of the plug, which is illustrated in FIG. 3, locking projection 37 is seated in the slot portion 39b wherein relative movement between the plunger 22 and housing 20 is precluded. In this position of the parts, the garter spring 55 may bias the actuating balls 33 inwardly and down into the groove 44 due to the position of the ball receiving apertures 48 of the sleeve, which are then aligned with the reduced portion 44.

When the plug is to be connected to a fitting to be tested, the jaws 32 are inserted within the end of the threaded fitting or other hollow fitting until the end face of the fitting bears against the annular seal block 34. The plunger and housing may then be unlocked through relative rotation of the same, whereupon spring 25 biases the plunger and sleeve outwardly relative to the housing to a position generally illustrated in FIG. 1. In the course of such movement, the balls are forced up the beveled surface 43 and into a position aligned with the portion 42 of enlarged diameter on the end of the stem. The balls thus move outwardly against the jaws to force the jaws radially outwardly and into a tight fitting and frictionally gripping engagement with the internal wall or threads of the fitting placed thereover. When the jaws are externally threaded for use with internally threaded conduits, the male threads of the jaws interlock with the female threads of the fitting to provide a positive lock. The fitting is thus closed and sealed. If the fitting is subjected to pressure, as in testing, the pressure within the fitting may pass through the bore 40 of the stem where it enters the space between the plunger and end wall of the housing. This provides a pressure bias of the plunger outwardly relative to the housing and increases the sealing contact between the end of the conduit and the annular sealing block 34.

When it is desired to remove the plug, the reverse movement of the parts takes place. Housing 20 is forced toward the fitting which forces the stem 27 outwardly relative to the sleeve 30 and jaws carried thereby until the balls 33 are aligned with the groove 44 whereupon the grip of the jaws is released and garter spring 55 may move the jaws radially inwardly. The housing and plunger may then be locked against relative rotation and the plug removed from the fitting.

It may be noted that some relative movement may occur between the actuating sleeve and the plunger against the bias of spring 31. This allows some relative movement between the jaws and threads. This is particularly useful to avoid damage to the parts due to excessive outward radial pressure developed on the jaws.

The plug may be used to supply fluid under pressure to a fitting for purposes of pressure testing. In this event, housing 20 may carry a port 57 (indicated in dotted outline in FIG. 5) and various types of fittings (not shown) for this purpose.

I claim:

1. A quickly attachable and detachable test plug for fluid conduits including a housing having a plunger slidably mounted therein, seal means disposed between said housing and said plunger, an actuating stem carried by said housing and positioned coaxially with said housing and plunger, said stem extending through and beyond said plunger, an actuating sleeve carried by said plunger and positioned coaxially with said stem and adapted for relative axial movement with respect to said stem, a plurality of tube gripping jaws carried by said sleeve on an outer end of said sleeve, a seal on the outer end of said plunger and positioned inwardly of said jaws, said jaws being confined axially of said sleeve and ball means associated with said jaws, said stem and said sleeve, operative, upon relative axial movement between said stem and said sleeve in one direction to cause radial outward movement of said jaws with respect to the axis of said stem to thereby provide an internal gripping connection with a fitting being tested.

2. The structure of claim 1 characterized by and including resilient means coacting between said plunger and housing for biasing said plunger outwardly relative to said housing.

3. The structure of claim 1 wherein said sleeve is mounted for limited movement axially within said plunger and resilient means bias said sleeve axially outwardly relative to said plunger.

4. The structure of claim 1 wherein said stem is hollow and includes an aperture for communicating pressure within said stem to the interior of said housing between said housing and said plunger.

5. The structure of claim 1 characterized by and including releasable means for locking said plunger in a preset axially withdrawn position relative to said housing.

6. The structure of claim 1 wherein said sleeve and said stem have interfitting groove and projection means to prevent relative rotation of said sleeve and stem.

7. The structure of claim 6 wherein said jaws and sleeve have interfitting groove and projection means to prevent relative rotation of said sleeve and jaws.

8. The structure of claim 1 characterized by and including resilient means for biasing said jaws radially inwardly.

9. The structure of claim 1 wherein said stem has an outer portion of enlarged external dimensions relative to the respective remaining portion thereof and a beveled portion between the enlarged portion and the remainder thereof, said ball means being confined by said sleeve to move along said enlarged portion and along said beveled portion during radial inward and outward movement thereof.

10. The structure of claim 9 wherein said sleeve has an enlarged bore portion receiving said enlarged portion of said stem.

11. The structure of claim 1 wherein said jaws carry external thread-like groove and projection means for a threaded engagement with the internal threads of a conduit to be tested.

* * * * *